United States Patent
Haslam et al.

(10) Patent No.: US 11,665,016 B2
(45) Date of Patent: May 30, 2023

(54) TRACTOR-TRAILER COMMUNICATION SYSTEM

(71) Applicant: DriverTech, LLC, Salt Lake City, UT (US)

(72) Inventors: Mark Haslam, Bountiful, UT (US); Jan DeHoop, Sandy, UT (US)

(73) Assignee: DriverTech, LLC, Salt Lake City, UT (US)

( * ) Notice: Subject to any disclaimer, the term of this patent is extended or adjusted under 35 U.S.C. 154(b) by 638 days.

(21) Appl. No.: 16/750,729

(22) Filed: Jan. 23, 2020

(65) Prior Publication Data

US 2020/0412574 A1 Dec. 31, 2020

Related U.S. Application Data

(60) Provisional application No. 62/867,601, filed on Jun. 27, 2019.

(51) Int. Cl.
| | |
|---|---|
| *H04L 12/40* | (2006.01) |
| *G01C 21/16* | (2006.01) |
| *H04W 4/40* | (2018.01) |
| *H04W 4/80* | (2018.01) |
| *G01C 21/34* | (2006.01) |

(52) U.S. Cl.
CPC ........ *H04L 12/40039* (2013.01); *G01C 21/16* (2013.01); *G01C 21/3469* (2013.01); *H04W 4/40* (2018.02); *H04W 4/80* (2018.02); *H04L 2012/40273* (2013.01)

(58) Field of Classification Search
CPC . B60T 8/1708; H04L 12/40; H04L 12/40039; H04L 2012/40273

USPC .............................................. 303/127; 701/36
See application file for complete search history.

(56) References Cited

U.S. PATENT DOCUMENTS

| | | | |
|---|---|---|---|
| 4,773,011 A | 9/1988 | Vanhoose | |
| 5,488,352 A | 1/1996 | Jasper | |
| 5,677,667 A | 10/1997 | Lesesky | |
| 5,693,985 A | 12/1997 | Gee | |
| 5,905,433 A | 5/1999 | Wortham | |
| 6,295,449 B1 | 9/2001 | Westerlage | |
| 6,687,609 B2 | 2/2004 | Hsiao | |
| 7,336,159 B2 | 2/2008 | Fackrell | |
| 7,434,643 B2 * | 10/2008 | Lesesky | G07C 5/008 |
| | | | 180/167 |
| 7,497,529 B2 | 3/2009 | Lesesky | |

(Continued)

FOREIGN PATENT DOCUMENTS

| | | |
|---|---|---|
| CN | 206584203 U | 10/2017 |
| EP | 1312492 A2 | 5/2003 |

(Continued)

*Primary Examiner* — Dalena Tran
(74) *Attorney, Agent, or Firm* — Steven L. Nichols; Fabian VanCott

(57) ABSTRACT

A communication system, including: a trailer module disposed on a cargo trailer, the trailer module including a trailer identification number for the cargo trailer; a tractor module disposed on a cargo tractor, the tractor module to electrically couple to the trailer module; and a communications bus to couple the trailer module to the tractor module when the trailer is coupled to the tractor, wherein, when coupled to the tractor module, the trailer module communicates the trailer identification to the tractor module.

26 Claims, 9 Drawing Sheets

(56) References Cited

U.S. PATENT DOCUMENTS

| | | | |
|---|---|---|---|
| 8,179,238 | B2 | 5/2012 | Roberts |
| 8,179,286 | B2 | 5/2012 | Faus |
| 8,188,847 | B2 | 5/2012 | Roberts |
| 8,358,205 | B2 | 1/2013 | Roberts |
| 8,760,274 | B2 | 6/2014 | Boling |
| 8,779,948 | B2 | 7/2014 | Faus |
| 9,084,076 | B2 | 7/2015 | Breed |
| 9,227,607 | B1 | 1/2016 | Ripley |
| 9,499,109 | B2 | 11/2016 | Armacost |
| 2006/0192427 | A1* | 8/2006 | Lesesky ................ B60T 8/1708 303/122 |
| 2011/0043342 | A1 | 2/2011 | Shepler |
| 2011/0043343 | A1 | 2/2011 | Shepler |
| 2016/0019497 | A1* | 1/2016 | Carvajal ................ H04L 67/104 705/333 |
| 2016/0052453 | A1 | 2/2016 | Nalepka |
| 2016/0214551 | A1 | 7/2016 | Armacost |
| 2017/0177949 | A1 | 6/2017 | Hu |
| 2017/0240153 | A1 | 8/2017 | Ripley |
| 2019/0241030 | A1* | 8/2019 | Cyllik ................ B60C 23/0416 |
| 2021/0061027 | A1* | 3/2021 | Da Deppo ............ B60C 23/041 |

FOREIGN PATENT DOCUMENTS

| | | | |
|---|---|---|---|
| EP | 1448952 | B1 | 4/2012 |
| GB | 2381915 | B | 6/2005 |
| JP | 2016539039 | A | 12/2016 |
| WO | 9738408 | A1 | 10/1997 |
| WO | 2007038839 | A1 | 4/2007 |
| WO | 2007047359 | A2 | 4/2007 |
| WO | 2009143692 | A1 | 12/2009 |
| WO | 2011038018 | A1 | 3/2011 |

\* cited by examiner

TRACTOR-TRAILER COMMUNICATION SYSTEM

BACKGROUND

Tractors which pull cargo trailers are known variously as semi-trailer trucks, a transport (truck) in Canada; semi or single in Australia; semi, tractor-trailer, big rig, or eighteen-wheeler in the United States; and articulated lorry, or arctic, in Britain and Ireland. Such vehicles are used to move large amounts of cargo by road. They have the advantage that the trailer can be readily disconnected from the tractor, allowing cargo to be loaded or unloaded without the tractor present. When the trailer is ready to be moved, a tractor is obtained and the tractor-trailer combination is transported to another location. This allows a single tractor to support multiple trailers.

BRIEF DESCRIPTION OF THE DRAWINGS

The accompanying drawings illustrate various examples of the principles described herein and are a part of the specification. The illustrated examples do not limit the scope of the claims.

Figure 1:
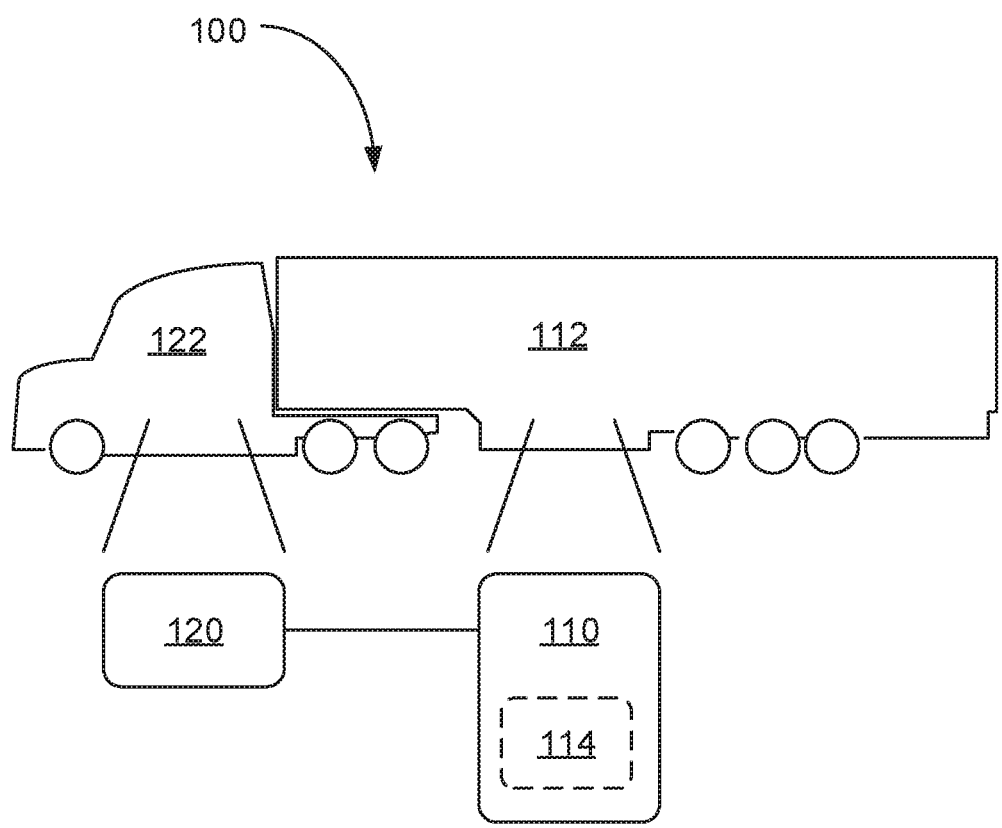
FIG. 1 shows a layout for a computer system consistent with this specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Tractors of semi-trailer trucks have an electrical power system supplied by a battery. This power system is continuously active absent a physical disconnect, for example, of the battery. This electrical power system provides electrical power to various components of the tractor and trailer at a given voltage over physical, generally copper, wires. However, these wires may also be used to carry signals in addition to and simultaneously with providing power. This allows the wiring to function as a communication network as well as a power distribution network in the vehicle.

Accordingly, a power line carrier network refers to a network of power and ground cables which is connected directly to the truck battery and is always on, even when the engine ignition switch is in the off state. The exception to this 'always-on' mode is when the battery is disconnected either by a master kill switch and/or by physically removing connection to the battery. Devices that are powered by the truck battery include all electrical and/or electronic devices on the truck (or tractor) and trailer that are not isolated by the ignition switch (key switch). The power line transceivers may be located in various places on the tractor and/or trailer where access to the power line is practical and may be connected to such devices as sensors in order to make the sensor information accessible to the telematic hub device.

Among other examples, this specification describes a communication system that includes a trailer module disposed on a cargo trailer. The trailer module includes a trailer identification number for the cargo trailer. The system also includes tractor module disposed on a cargo tractor. The tractor module is electrically coupled to the trailer module. The communication system also includes a communications bus to couple the trailer module to the tractor module when the trailer is coupled to the tractor. When coupled to the tractor module, the trailer module communicates the trailer identification to the tractor module.

Among other examples, this specification also describes a method. The method includes receiving an expected trailer identification number of a cargo trailer intended for a cargo tractor; determining, from a trailer module coupled to the cargo tractor via a power line carrier, a current trailer identification number for a cargo trailer currently coupled to the cargo tractor; and determining, based on a comparison of the expected trailer identification number and the current trailer identification number, when the intended cargo trailer is actually coupled to the cargo tractor.

This specification also describes a communication system. The communication system includes a trailer module disposed on a cargo trailer. The trailer module includes a trailer identification number for the cargo trailer and a power line transceiver for communicating along the power line carrier communication network. The system also includes a tractor module disposed on a cargo tractor. The tractor module is to electrically couple to the trailer module. The tractor module includes a power line transceiver for communicating along the power line carrier communication network and a secondary transceiver for receiving information from non-power line sensors. The system also includes a power line carrier communication network to couple the trailer module to the tractor module when the trailer is coupled to the tractor. When coupled to the tractor module, the trailer module communicates the trailer identification to the tractor module. The system also includes a number of first sensors coupled to the power line carrier communication network to transmit information along the power line carrier communication network to the tractor hub regarding an associated subsystem of the cargo trailer and a number of second sensors coupled to transmit information, via a separate communication protocol, to the tractor module secondary transceiver.

Also described is a cargo trailer communication system that includes a trailer module disposed on a cargo trailer, the trailer module including: a processor; a memory device storing a trailer identification number for the cargo trailer; and a transmitter to selectively transmit the trailer identification number via a short-wavelength ultra-high frequency communication protocol. The system also includes a device detector to determine when a receiving device is within range. When a receiving device is within range, the transmitter transmits the trailer identification number to the receiving device.

This specification also describes a method that includes determining, at a short-wavelength ultra-high frequency receiver, when a cargo trailer short-wavelength ultra-high frequency transceiver is within range. When a cargo trailer transceiver is within range, a trailer identification number is extracted from the cargo trailer for any cargo trailer within range. The method also includes transmitting the current trailer identification numbers associated with cargo trailers in range to a remote location.

Also described is a communication system that includes a tractor module disposed on a cargo tractor and a number of sensors disposed about the cargo tractor to detect a status of a cargo tractor subsystem. The number of sensors is coupled to the tractor module via a power line carrier. The number of sensors transmits a status of a respective cargo tractor subsystem to the tractor module.

Among other examples is described, a method. The method includes determining, with a sensor disposed in a cargo tractor, a state of a cargo tractor subsystem. The method also includes transmitting via a power line carrier, the state of the cargo tractor subsystem to a tractor module disposed in the cargo tractor. The method also includes displaying a status of multiple cargo tractor subsystems on the tractor module.

Turning now to the figures, FIG. 1 shows a communication system (100) consistent with this specification. The communication system (100) includes: a trailer module (110) disposed on a cargo trailer (112). The trailer module (110) includes a trailer identification number (114) for the cargo trailer (112). The communication system (100) also includes a tractor module (120) disposed on a cargo tractor (122). The tractor module (120) is to electrically couple to the trailer module (110). The system also includes a communications bus to couple the trailer module (110) to the tractor module (120) when the trailer (112) is coupled to the tractor (122). When coupled to the tractor module (120), the trailer module (110) communicates the trailer identification (114) to the tractor module (120).

The communication system (100) is a system for tracking the cargo trailer (112) being pulled by the tractor (122). The trailer identification number (114) is provided to identify the cargo trailer (112). The computer system (100) may provide the cargo trailer identification number (114) and/or other information to an external system, for example, to a fleet supervisor, to track trailers (112) and tractors (122) and their status. In an example, the information is provided with a global positioning system (GPS) and/or similar location information systems to allow tracking of the trailer (112) and tractor (122).

The trailer module (110) is disposed on a cargo trailer (112) and includes a trailer identification number (114).

The cargo trailer (112) may be used to move cargo between locations. The cargo trailer (112) has a trailer identification number (114). In some examples, the trailer identification number (114) is unique. The trailer identification number (114) may be a serial number. The trailer identification number (114) may be made up of multiple numbers, for example, identifying trailer model and serial numbers.

The communication system (100) may include a lookup table to convert the trailer identification number (114) to additional information about the trailer (112). For example, the communication system (100) may look up a date of manufacture, total miles traveled, a date of last maintenance, and/or similar information. In an example, the communication system (100) may provide the trailer identification number (114) to an external database and receive the additional information on the cargo trailer (112) back from the external database.

The tractor module (120) is disposed on a tractor (122). The tractor module (120) receives communication from the trailer module (110) when the trailer (112) is coupled to the tractor (122). In an example, the coupling of the trailer (112) to the tractor (122) includes coupling the trailer (112) to a power system of the tractor (122). The provision of power from the power system of the tractor (122) to the trailer (112) may serve to signal the trailer module (110) to provide the trailer identification number (114) to the tractor module (120). The trailer module (110) may include a time delay prior to providing the trailer identification number (114). For example, the trailer module (110) may wait 1, 2, 3, 5, 10, or some other number of minutes after receiving power before sending the trailer identification number (114) to the tractor module (120).

In an example, the tractor module (120) may make an identification request to additional, or all, components of the computer system (100). The various components, including the trailer module (110) may respond to the request with identification and/or data. The computer system (100) may make a request to a series of modules in series. For example, the computer system may request a first trailer module (110) identify itself, then a second trailer module (110) identify itself, then a tire pressure module on a cargo trailer (112) identify itself. This serialized approach may prevent different modules from attempting to communicate simultaneously on a shared communication line (e.g., a power network). In an example, the computer system (100) uses an established communication standard to communicate the requests and responses. Examples of such standards may include: Local Interconnect Network (LIN), Controller Area Network (CAN), and/or CAN with Flexible Data rate (CAN-FD).

The communication system (100) may include a data hub to couple the communication bus and the tractor module (110). The data hub may have different ports for the communication bus and the tractor module (110).

In an example, the communication bus is a power line carrier to distribute power to various cargo trailer (112) subsystems. For example, the communication system (100) may have the trailer module (110) include a power line transceiver to connect the trailer module (110) to the power line carrier. The tractor module (120) may also include a power line transceiver to connect the tractor module (120) to the power line carrier. Each transceiver may include: a message handler; a multiphase modem; a transmit amplifier; and a receive amplifier. The modules may further include a microcontroller to write information to the respective power line transceivers.

The tractor power line transceivers may be coupled to transceivers of a secondary communication protocol to connect with subsystems that communicate with a secondary communication protocol and not a power line communication protocol.

The communication system (100) may further include a number of sensors disposed about the trailer coupled to the communications bus, wherein each sensor monitors a subsystem of the cargo trailer. The number of sensors may monitor at least one of: a state of a tire inflation system; a fuel level; a brake pad thickness; a tire disintegration level; a seat belt status; a wheel rotation counter; and a windshield wiper status. The sensors may monitor headlights, running lights, high beam headlights, etc. The sensor may further include environmental sensors, e.g., temperature, humidity, visibility, etc.

The communication system (100) may include a second communications bus to couple the tractor module (120) to sensors via a different protocol than used on the first communications bus. For example, the second communication channel may be a radio-frequency communication channel.

In some examples, when coupled to the trailer module (110), the tractor module (120) sends digital messages to electronic devices on the cargo trailer (112). In an example, the communication system (100) inventories radio frequency identification tags (RFID) on the cargo trailer (112). The communication system (100) may perform the inventory at fixed intervals, e.g., every 2 hours. The communication system (100) may perform the inventory at startup of the tractor (122). The communication system (100) may perform the inventory in response to preplanned stops and/or location information.

Figure 2:
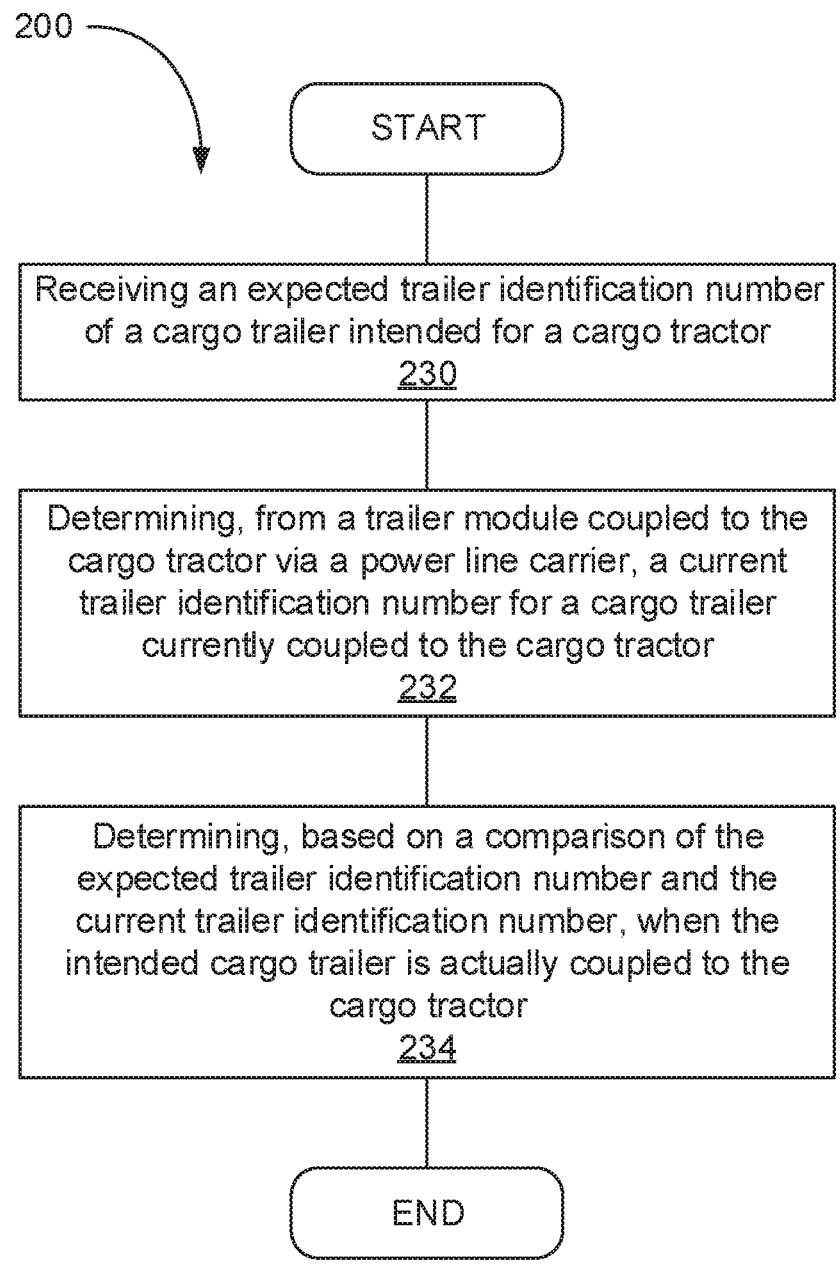
FIG. 2 shows a flowchart of a method constant with this specification.

FIG. 2 shows a flowchart of a method (200) consistent with this specification. The method (200) includes receiving (230) an expected trailer identification number (114-2) of a cargo trailer (112) intended for a cargo tractor (122), determining (232), from a trailer module (110) coupled to the cargo tractor (122) via a power line carrier, a current trailer identification number (114-1) for a cargo trailer (112) currently coupled to the cargo tractor (122), and determining (234), based on a comparison of the expected trailer identification number and the current trailer identification number, when the intended cargo trailer (112) is actually coupled to the cargo tractor (122).

As described above, the method (200) includes receiving (230) an expected trailer identification number (114-2) of a cargo trailer (112) intended for a cargo tractor (122). This expected trailer identification number (114-2) identifies the cargo trailer (112) to be attached to the cargo tractor (122). The expected trailer identification number (114-2) may be obtained automatically by a communication system (100). The expected trailer identification number (114-2) may be entered by a user, for example, a driver or a fleet manager. The expected trailer identification number (114-2) may be received as a text message, email, and/or similar communication.

The method (200) includes determining (232), from a trailer module (110) coupled to the cargo tractor (122) via a power line carrier, a current trailer identification number (114-1) for a cargo trailer (112) currently coupled to the cargo tractor (122). The method (200) may include sending a request via the power line carrier. The method (200) may include waiting for a response from a cargo trailer module (110). The method (200) may include extracting a trailer identification number (114-1) from the response.

The method (200) includes determining (234), based on a comparison of the expected trailer identification number (114-2) and the current trailer identification number (114-1), when the intended cargo trailer (112) is actually coupled to the cargo tractor (122).

Figure 3:
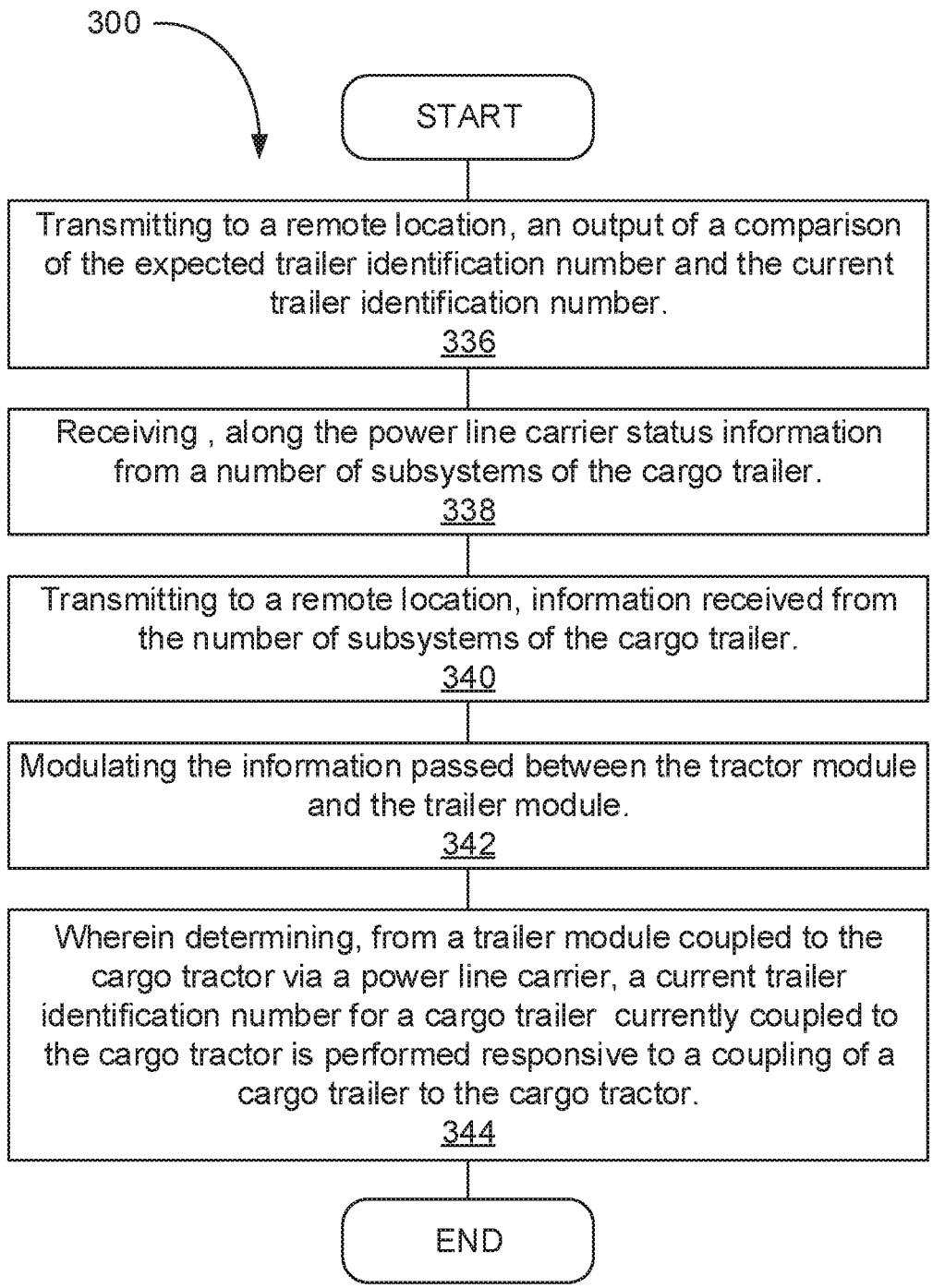
FIG. 3 shows a flowchart of a method constant with this specification.

FIG. 3 shows a method (300) consistent with this specification. The method (300) may include one or more of the following: transmitting (336) to a remote location, an output of a comparison of the expected trailer identification number (114-2) and the current trailer identification number (114-1); receiving (338), along the power line carrier status information from a number of subsystems of the cargo trailer (112); transmitting (340) to a remote location, information received from the number of subsystems of the cargo trailer (112); modulating (342) the information passed between the tractor module (120) and the trailer module (110); and/or wherein determining, from a trailer module (110) coupled to the cargo tractor (122) via a power line carrier, a current trailer identification number (114-2) for a cargo trailer (112) currently coupled to the cargo tractor (122) is performed responsive to a coupling of a cargo trailer (112) to the cargo tractor (122).

The method (300) may include transmitting (336) to a remote location, an output of a comparison of the expected trailer identification number (114-2) and the current trailer identification number (114-1). The output may be transmitted by the same method used to receive the expected trailer identification number (114-2). In some examples, the output may be transmitted using a second method. For example, the expected trailer identification number (114-1) may be received from user input but the comparison may be transmitted using a mobile and/or cellular network.

The method (300) may include receiving (338), along the power line carrier, status information from a number of subsystems of the cargo trailer (114). Examples of subsystems may include a tire pressure system, a tire wear monitoring system, a chains status identifier, an odometer, a speedometer, a temperature sensor, a pressure sensor, a wheel rotation sensor, etc.

The method (300) may include transmitting (340) to a remote location, information received from the number of subsystems of the cargo trailer (114). The transmission may be provided together with the output of the comparison of the expected trailer identification number (114-2) and the current trailer identification number (114-1). The transmission may include the current trailer identification number (114-1).

The method (300) may include modulating (342) the information passed between the tractor module (120) and the trailer module (110). Modulation may include converting from a first protocol to a second protocol. Modulation may include extracting information to a second format from a first format.

The method (300) may also include determining, from a trailer module (110) coupled to the cargo tractor (122) via a power line carrier, a current trailer identification number (114-1) for a cargo trailer (112) currently coupled to the cargo tractor (122). This may be performed responsive to a coupling of a cargo trailer (112) to a cargo tractor (122). In an example, the provision of power via the coupling initiates the provision of the trailer identification number (114) by the trailer module (110). In some examples, it may be useful to include a delay between provision of power and transmission of the trailer identification number (114) to allow any transients to resolve. In other examples, a handshake and/or similar exchange precedes providing the trailer identification number (114). In some examples, the trailer identification number (114) is provided in response to a request. In an example, the trailer identification number (114) is provided without a request.

Figure 4:
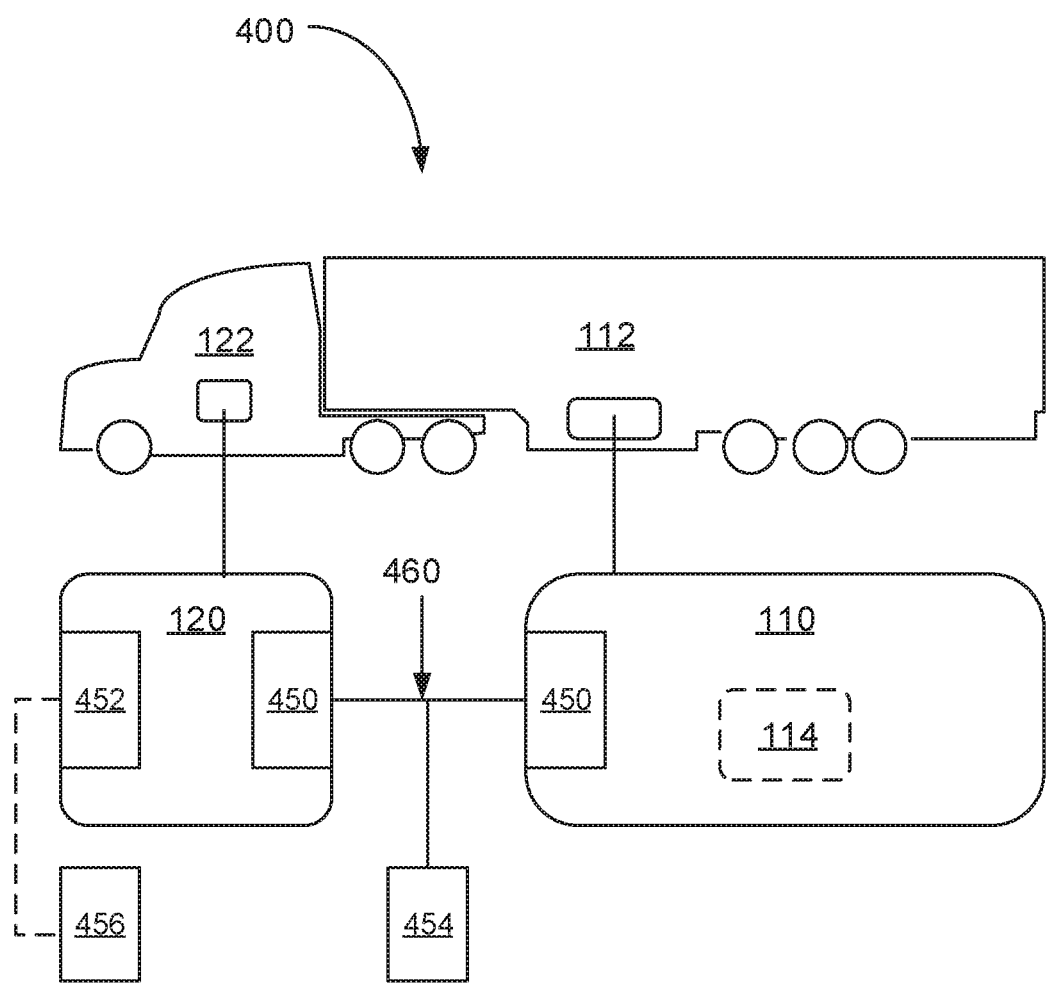
FIG. 4 shows a layout for a computer system consistent with this specification.

FIG. 4 shows an example of a communication system (400) consistent with this specification. The computer system (400) includes a trailer module (110) disposed on a cargo trailer (112). The trailer module (110) includes a trailer identification number (114) for the cargo trailer (112) and a power line transceiver (450) for communicating along a power line carrier communication network (460). The communication system (400) also includes a tractor module (120) disposed on a cargo tractor (122). The tractor module (120) is to electrically couple to the trailer module (110). The tractor module (120) includes a power line transceiver (450)

for communicating along the power line carrier communication network (460) and a secondary transceiver (452) for receiving information from a number of non-power line sensors (456). The communication system (400) also includes the power line carrier communication network (460) to couple the trailer module (110) to the tractor module (120) when the trailer (112) is coupled to the tractor (122). When coupled to the tractor module (120), the trailer module (110) communicates the trailer identification number (114) to the tractor module (120). The computer system (400) also includes a number of first sensors (454) coupled to the power line carrier communication network (460) to transmit information along the power line carrier communication network (460) to the tractor hub regarding an associated subsystem of the cargo trailer; and the number of non-power line sensors (456) coupled to transmit information, via a separate communication protocol, to the tractor module (120) secondary transceiver.

The system (400) includes two power line transceivers (450) for communicating along the power line carrier communication network (460). The tractor module (120) includes a first power line transceiver (450) and the trailer module (110) includes a second power line transceiver (450). The two transceivers (450) facilitate communication between the tractor module (120) and the trailer module (110) over the power line carrier communication network (460).

The tractor module (120) also includes a secondary transceiver (452) for receiving information from a number of non-power line sensors (456). The secondary transceiver (452) operates on a different principle and/or protocol than the power line transceiver (450). For example, the secondary transceiver (452) may receive radio signals, such as short range radio signals. An example of such signals is the Bluetooth™ standard. Other short range communication protocols, e.g., IEEE 802.11 may be used.

The system (400) includes a number of first sensors (454) which are coupled to the power line carrier communication network (460). The use of the power line carrier communication network (460) has the advantage of providing power and communications for the sensors involved.

The system (400) includes a number of non-power line sensors (456). These sensors communicate using the secondary transceiver (452). The non-power line sensors (456) may draw power from the power lines. The non-power line sensors may use a secondary power source, for example, a battery, and/or the alternator. The use of non-power lines sensors (456) may be advantageous in not using the physical power cabling to connect the sensors. This allows the non-power lines sensor (456) to be placed in a location without a power cable and/or without having to make a connection to the power cable.

Figure 5:
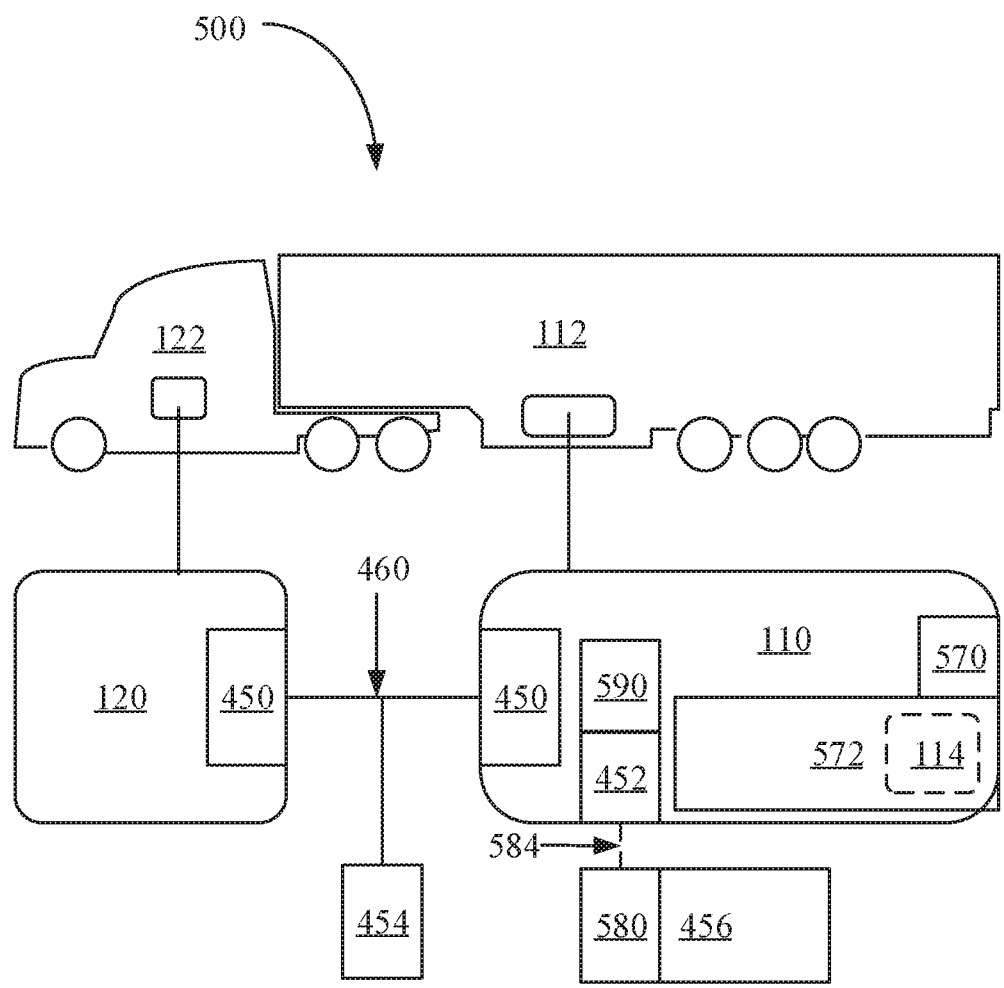
FIG. 5 shows a cargo trailer communication system consistent with this specification.

The power line communication network (460) uses the power lines to transmit messages. The messages may be transmitted between the tractor module (120) and the trailer module (110). The messages may be transmitted between various power line sensor(s) (454) and the tractor module (120). In an example, the power line carrier communication network (460) includes: a physical layer of power wires; a low level communication protocol defined by the power line carrier transceivers; and a higher level protocol that enables structured message communication between power line transceivers and the tractor module (120), FIG. 5 shows a cargo trailer communication system (500) consistent with this specification. The cargo trailer communication system (500) includes a trailer module (110) disposed on a cargo trailer (112). The trailer module (110) includes a processor (570), a memory device (572) storing a trailer identification number (114) for the cargo trailer (112), a transmitter (580) to selectively transmit the trailer identification number (114) via a short-wavelength ultra-high frequency communication protocol (582), a device detector (590) to determine when a receiving device is within range. When a receiving device is within range, the transmitter (580) transmits the trailer identification number (114) to the receiving device.

The processor (570) may be a general purpose processor. The processor (570) may be an Application Specific Integrated Circuit (ASIC), The processor (570) may be a cluster of processors (570) programmed to work together.

The memory device (572) may store the trailer identification number (114) in a read-only memory (ROM), for example, as a RFID and/or similar tag. The memory device (572) may be a writeable memory, for example, a flash memory and/or similar. In some examples, the memory device (572) also contains instructions for the processor (570). The memory device (572) may store data from various sensors associated with the cargo trailer (112). For example, the memory device (572) may log sensor measurements at regular intervals under the control of the processor (570). In some examples, the memory device (572) is designed to be removable from the trailer module (110), for example, to download all the stored data without having the transmit that data over the power line connector (460). In an example, the memory device (572) is a flash drive connected to the processor (570) via a port. The memory device (572) may comprise a plurality of memory devices (572). In an example, data is stored on a rotating basis in the plurality of memory devices (572). The data may include a parity device so as to function similar to a RAID allowing recovery of the data in the event one or more memory device (572) is damaged or unrecoverable. In another example, data is stored on multiple memory devices (572) to provide backups in the event of damage or other issues. In yet another example, data points are stored in a round-robin fashion on different memory devices (572) so that loss of a memory device (572) does not result in the loss of all relevant data.

In an example, the memory device (572) may be designed to store information for a fixed period of time, e.g., 72 hours, before overwriting the prior data. The amount of data retained may be related to the frequency of measurements taken and stored. Different sensors may have measurement frequencies. Some sensors may be event triggered. For example, turning on the windshield wipers may create a record for the windshield wiper sensor, which then logs activity every 5 minutes. In contrast, tire wear sensors may record every 24 hours.

The transmitter (580) selectively transmits the trailer identification number (114) via a short-wavelength ultra-high frequency communication protocol (582). In an example, the transmitter (580) is a Bluetooth™ transmitter and the short-wavelength ultra-high frequency communication protocol (582) is Bluetooth™. Other wavelengths and/or protocols (582) may be substituted; however, the cost of equipment makes use of standard protocols such as Bluetooth™ and/or IEEE 801.11 attractive.

In some examples, the cargo trailer communication system (500) further includes an authenticator to authenticate the receiving device prior to transmission of the trailer identification number (114).

The cargo trailer communication system (500), may further include a number of sensors (454,456) disposed about the trailer (112) and coupled to the trailer module (112).

Each sensor (454,456) may monitor a subsystem of the cargo trailer (112) and the transmitter (580) selectively transmits an output of the number of sensors (454,456) to the receiving device when in range. The number of sensors (454, 456) may monitor at least one of: a state of tire inflation; a brake pad thickness; a tire disintegration level; and a wheel rotation counter.

The communication system (500) includes a device detector (590) to determine when a receiving device is within range. When the device detector (590) detects a receiving device is within range, the transmitter provides the recited information, including the trailer identification number (114). The device detector (590) may first complete a handshake prior to providing the information. The device detector (590) may be a passive device which detects the counterparts but leaves to the transmitter to create a connection and pass the information.

Figure 6:
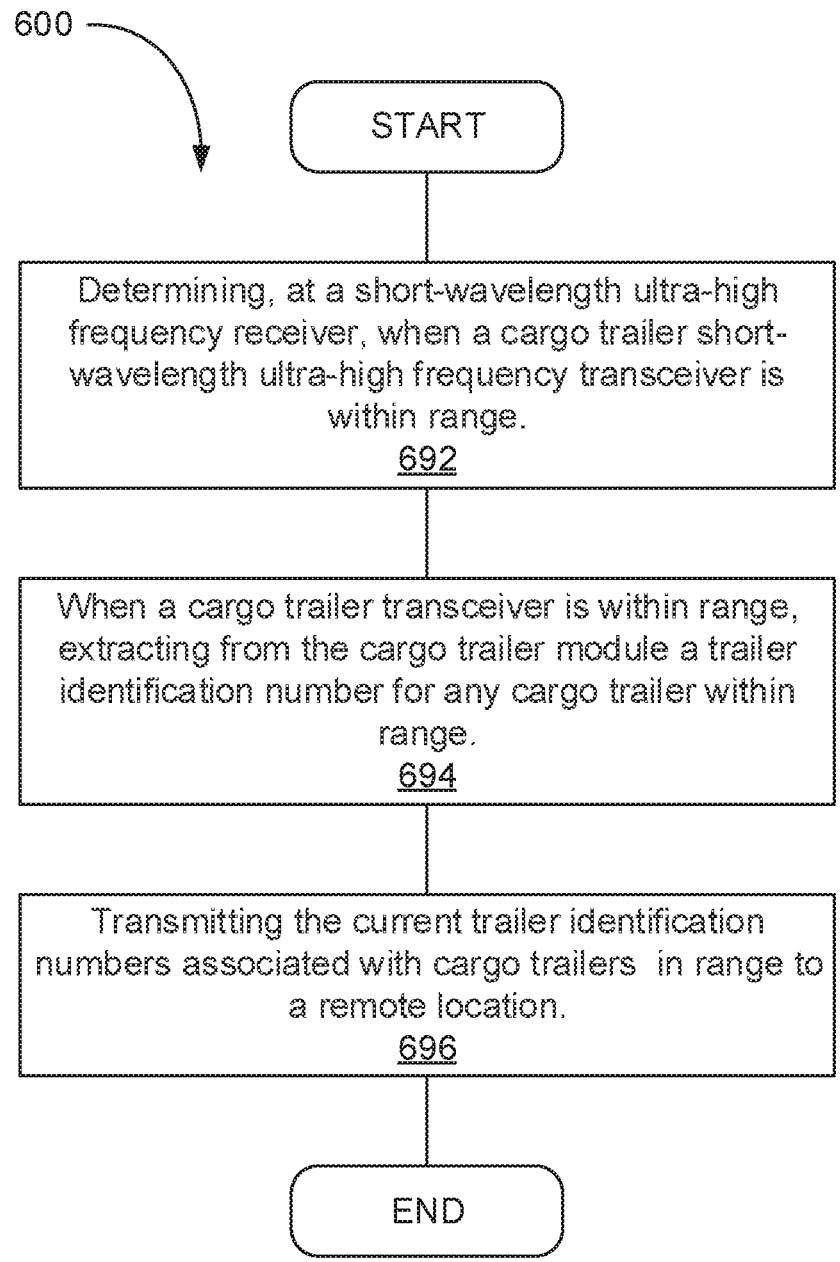
FIG. 6 shows a flowchart of a method consistent with this specification.

FIG. 6 shows a flowchart of a method (600) consistent with this specification. The method (600) includes determining (692), at a short-wavelength ultra-high frequency receiver, when a cargo trailer (112) short-wavelength ultra-high frequency transceiver is within range. When a cargo trailer transceiver is within range, the method (600) includes extracting (694) from the cargo trailer module (110) a trailer identification number (114) for any cargo trailer within range and transmitting (696) the current trailer identification numbers (114) associated with cargo trailers (112) in range to a remote location.

The method (600) includes determining (692), at a short-wavelength ultra-high frequency receiver, when a cargo trailer (112) short-wavelength ultra-high frequency transceiver (584) is within range. The short-wavelength ultra-high frequency transceiver may use the Bluetooth™ protocol. Such a determination may include sending an identification request and then identifying responses to the identification request.

The method (600) includes, when a cargo trailer transceiver is within range, extracting (694) from the cargo trailer module (110), a trailer identification number (114) for any cargo trailer (112) within range. The method (600) may extract the trailer identification number (114) for a single cargo trailer (112). The method (600) may extract trailer identification numbers (114) for multiple cargo trailers (112). In some examples, additional limitations are used to prevent identification of cargo trailers (112) near, but not attached to, the cargo tractor (122). For example, the method (600) may include checking at multiple time periods once the cargo tractor (122) is in motion. This will prevent cargo trailers (112) in the vicinity from erroneously being reported as attached to the cargo tractor (122).

The method (600) includes transmitting (696) the current trailer identification numbers (114) associated with cargo trailers (112) in range to a remote location. The transmitting may be performed over a cellular network. The transmitting may be performed over a radio. In any example, the transmission may be encoded. The transmission may be unencrypted. The transmission may be a text message, email, and/or other message format. The transmission may be held until an appropriate network is available to transmit the message.

The method (600) may further include populating a database at the remote location with trailer identification numbers (114) associated with cargo trailers (112) in range of the receiver. The method (600) may include transmitting, to the remote location, at least one of a Global Positioning System (GPS) location and a time stamp associated with reception of a trailer identification number (114) associated with each cargo trailer (112) in range. The method (600) may include preventing display of the current trailer identification numbers (114) associated with in range cargo trailers (112) on the receiver.

Figure 7:
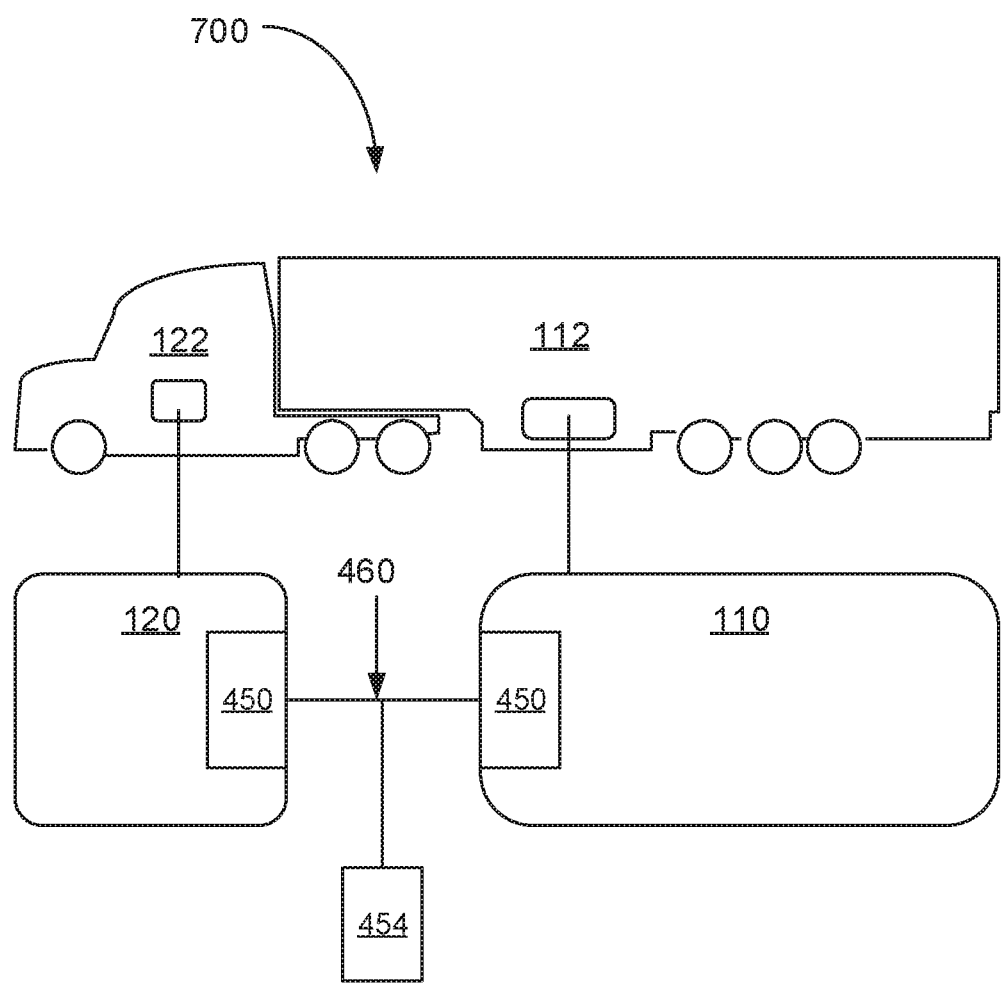
FIG. 7 shows a communication system consistent with this specification.

FIG. 7 shows a communication system (700) consistent with the present specification. The communication system (700) includes a tractor module (120) disposed on a cargo tractor (122) and a number of sensors (454) disposed about the cargo tractor (120) to detect a status of a cargo tractor subsystem. The number of sensors (454) are coupled to the tractor module (120) via a power line carrier (460) and transmit a status of a respective cargo tractor subsystem to the tractor module (120).

In an example, the communication system (700) may include a data hub to couple to the communication bus and the tractor module (120). The number of sensors (454) may monitor at least one of: a fuel level; a seat belt status; and a windshield wiper status.

Figure 8:
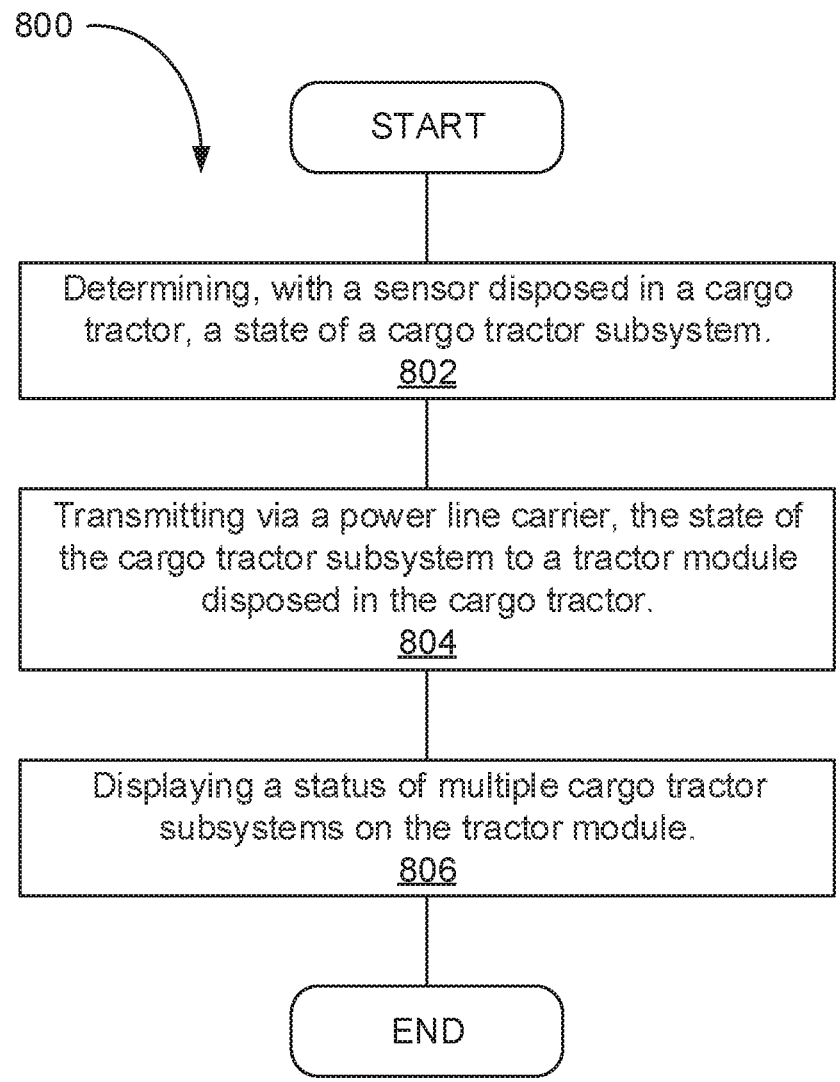
FIG. 8 shows a flowchart of a method consistent with this specification.

FIG. 8 shows a flowchart of a method (800) consistent with this specification. The method (800) includes: determining (802), with a sensor (454) disposed in a cargo tractor (112), a state of a cargo tractor subsystem; transmitting (804) via a power line carrier (460), the state of the cargo tractor subsystem to a tractor module (120) disposed in the cargo tractor (122); and displaying (806) a status of multiple cargo tractor subsystems on the tractor module (120).

In general, the method (800) is a method of monitoring sensors in the cargo tractor (112). The sensor information is provided by the power line carrier (460) to the cargo tractor module (120). The tractor module (120) then displays the subsystem information. This may allow, for example, a driver to monitor the subsystems from within the cab of the cargo tractor (122).

The method (800) includes determining (802), with a sensor (454) disposed in a cargo tractor (110), a state of a cargo tractor subsystem. The method (800) may include sending a prompt to the cargo tractor subsystem. The method (800) may include receiving a response to the prompt. The method (800) may include sending a prompt at periodical intervals to the cargo tractor subsystem. For example, the method may include sending a prompt every 1, 2, 3, 5, 10, 15, 20, 30, 60 minutes, and/or some other interval. Different cargo tractor subsystems may have different prompt intervals. The prompt may be provided via the power line carrier (460). The prompt may be provided via a separate communication method, e.g., Bluetooth™.

The method (800) includes transmitting (804) via a power line carrier (460), the state of the cargo tractor subsystem to a tractor module (120) disposed in the cargo tractor (122). The state of the cargo tractor subsystem may be received at the tractor module (120). The state of the cargo tractor system may indicate whether the state of the cargo tractor subsystem is within, or outside, of specification and/or may be measurements of an operating parameter.

The method (800) includes displaying (806) a status of multiple cargo tractor subsystems on the tractor module (120). In an example, the tractor module (120) includes a display. The display may be visible to an operator. For example, the display may be mounted where visible to the operator while driving the cargo tractor (122). The tractor module (120) may include an audio indicator which sounds when a cargo trailer subsystem is outside of specification. The tractor module (120) may sound when the cargo trailer subsystem is first outside of specification and then periodically, for example, every 10 minutes, thereafter. The tractor module (120) may sound continuously and/or semi continuously depending on the danger represented by the out of specification condition. For example, if the tire pressure is slightly outside of specification, a first alarm may be used but if the tire pressure indicates a blown tire, a second alarm may be used. In some examples, the display is not visible to the driver while driving to reduce the visual distraction to the driver. The tractor module (120) may communicate warnings using audio prompts, including voice prompts, alarms, bells, chimes, etc. in addition to using visual notifications in a display.

In an example, the trailer system includes a tire rotation sensor. The number of tire rotations per unit distance may be used to estimate tire wear. For example, the diameter of an unworn tire (D1) may have X revolutions per mile. The diameter of a worn tire (D2) may have Y revolutions per mile. Accordingly, the calculation of the tire wear as the change in diameter can be calculated to estimate tread wear. $X*D1*pi=Y*D2*pi$ so $Y=X*(D1/D2)$. It follows that treat wear=$(D1-D2)/2$. This can be readily performed over any distance measurement, for example, the odometer, or alternately, using a GPS system.

Figure 9:
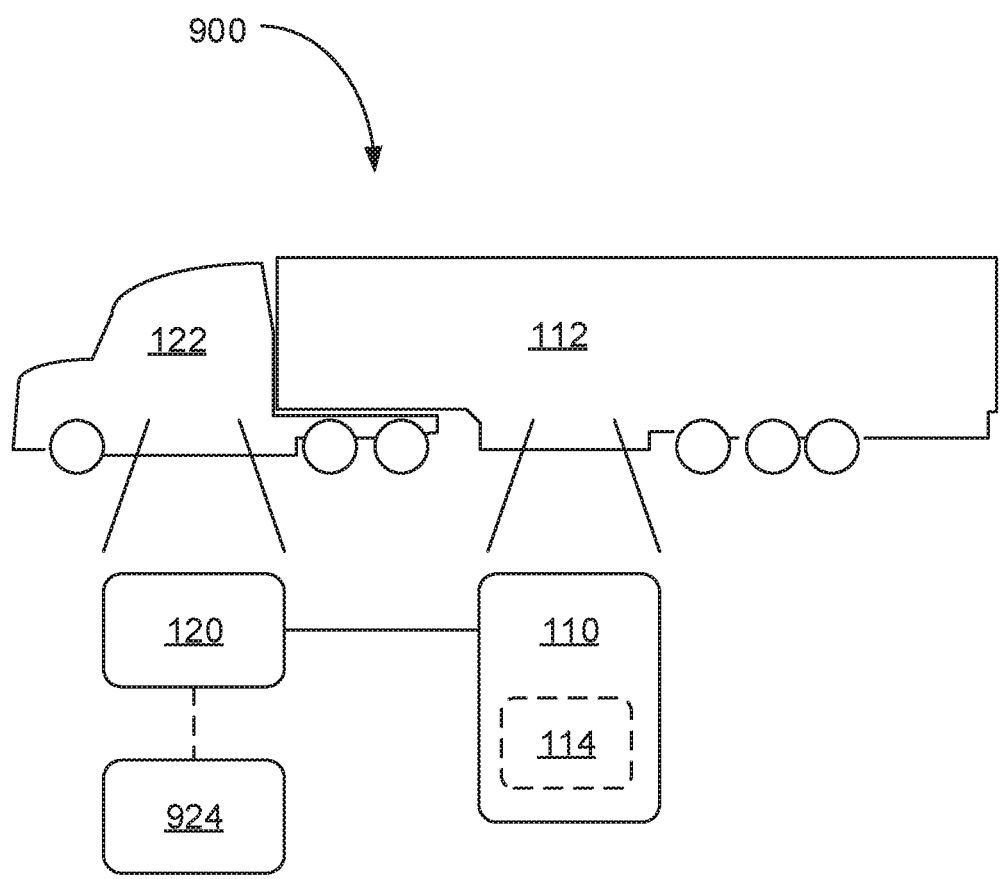
FIG. 9 shows a communication system consistent with this specification.

FIG. 9 shows a communication system (900) consistent with this specification. The communication system (100) includes: a trailer module (110) disposed on a cargo trailer (112), the trailer module (110) comprising a trailer identification number (114) for the cargo trailer (112); a tractor module (120) disposed on a cargo tractor (122), the tractor module (120) to electrically couple to the trailer module (110); and a communications bus (130) to couple the trailer module (110) to the tractor module (120) when the trailer (112) is coupled to the tractor (122). When coupled to the tractor module (120), the trailer module (110) communicates the trailer identification (114) to the tractor module (120). The communication system (900) may also include a computer (924) communicatively coupled to the tractor module (120).

The computer (924) may be mounted in the tractor (122). The computer (924) may be a laptop, tablet, phone, or similar device. The computer (924) may perform much of the processing of data for the communication network, offloading resources from the tractor module (120). The computer (924) may be a dedicated computer (924). Alternately, the computer (924) may be a general purpose computer (924). The computer (924) may be physically connected to the tractor module (120) using a port. The computer (924) may communicate wirelessly with the tractor module (120). The computer (924) includes a processor and a coupled, associated memory. The computer (924) may be mounted in the cab of the tractor (122).

It will be appreciated that, within the principles described by this specification, a vast number of variations exist. It should also be appreciated that the examples described are only examples, and are not intended to limit the scope, applicability, or construction of the claims in any way.

What is claimed is:

1. A communication system, comprising:
a trailer module disposed on a cargo trailer, the trailer module comprising a trailer identification number for the cargo trailer;
a tractor module disposed on a cargo tractor, the tractor module to electrically couple to the trailer module via a power line carrier connected between the trailer and tractor; and
power line transceivers with the trailer module and tractor module to communicate data over the power line carrier when the trailer is electrically coupled to the tractor,
wherein, when coupled to the tractor module, the trailer module communicates the trailer identification number to the tractor module over the power line carrier.

2. The communication system of claim 1, wherein the trailer module responds to a new power line connection between the trailer and tractor by transmitting the trailer identification number to the tractor module via the power line carrier.

3. The communication system of claim 2, wherein the trailer module waits a delay time before sending the trailer identification number to avoid transients in the power line carrier.

4. The communication system of claim 1, wherein:
the trailer module comprises a first power line transceiver to connect the trailer module to the power line carrier;
the tractor module comprises a second power line transceiver to connect the tractor module to the power line carrier; and
each transceiver comprises:
a message handler;
a multiphase modem;
a transmit amplifier; and
a receive amplifier.

5. The communication system of claim 4, wherein the modules are coupled to transceivers of a secondary communication protocol to connect with subsystems that communicate with a secondary communication protocol and not a power line communication protocol.

6. The communication system of claim 1, further comprising a number of sensors disposed about the trailer coupled to the power line carrier, wherein each sensor monitors a subsystem of the cargo trailer.

7. The communication system of claim 6, further comprising a communications bus to couple the trailer module to sensors via a different protocol than used on the power line carrier.

8. The communication system of claim 7, wherein the second communication channel is a radio-frequency communication channel.

9. The communication system of claim 7, wherein the second communication channel is a wired communication channel.

10. The communication system of claim 6, wherein the number of sensors monitor at least one of:
a state of a tire inflation system;
a fuel level;
a brake pad thickness;
a tire disintegration level;
a seat belt status;
a wheel rotation count; and
a windshield wiper status.

11. The communication system of claim 1, wherein, when coupled to the trailer module, the tractor module sends digital messages to electronic devices on the cargo trailer.

12. The communication system of claim 1, the tractor module programmed for:
receiving an expected trailer identification number of a cargo trailer intended for the cargo tractor;
receiving the trailer identification number for the cargo trailer currently coupled to the cargo tractor; and
determining, based on a comparison of the expected trailer identification number and the current trailer identification number, when the intended cargo trailer is actually coupled to the cargo tractor.

13. The communication system of claim 12, wherein the tractor module is further programmed for transmitting, to a remote location, an output of the comparison of the expected trailer identification number and the current trailer identification number.

14. The communication system of claim 1, wherein the tractor module is programmed for receiving, along the power line carrier, status information from a number of subsystems of the cargo trailer in addition to the trailer identification number.

15. The communication system of claim 14, wherein the tractor module is programmed for transmitting, to a remote location, information received from the number of subsystems of the cargo trailer.

16. The communication system of claim 1, comprising:
the trailer module further comprising:
a first power line transceiver for communicating along a power line carrier communication network comprising the power line carrier;
the tractor module further comprising:
a second power line transceiver for communicating along the power line carrier communication network; and
a secondary transceiver for receiving information from a number of non-power line sensors;
a number of first sensors coupled to the power line carrier communication network to transmit information along the power line carrier communication network to the tractor huh regarding an associated subsystem of the cargo trailer; and
the number of non-power line sensors coupled to transmit information, via a separate communication protocol, to the trailer module secondary transceiver.

17. The communication system of claim 16, wherein the power line carrier communication network comprises:
a physical layer of power wires;
a low level communication protocol defined by the power line transceivers; and
a higher level protocol that enables structured message communication between power line transceivers.

18. The communication system of claim 1, wherein the trailer module further comprises:
a processor;
a memory device storing the trailer identification number for the cargo trailer; and
a transmitter to selectively transmit the trailer identification number via a short-wavelength ultra-high frequency communication protocol; and
a device detector to determine when a receiving device is within range,
wherein, when a receiving device is within range, the transmitter transmits the trailer identification number to the receiving device.

19. The communication system of claim 18, further comprising an authenticator to authenticate the receiving device prior to transmission of the trailer identification number.

20. The communication system of claim 18, further comprising a number of sensors disposed about the trailer coupled to the trailer module, wherein:
each sensor monitors a subsystem of the cargo trailer; and
the transmitter selectively transmits an output of the number of sensors to the receiving device when in range.

21. The communication system of claim 1, the tractor module being programmed for:
determining, with a short-wavelength ultra-high frequency receiver, when a cargo trailer short-wavelength ultra-high frequency transceiver is within range;
when a cargo trailer transceiver is within range, extracting from the cargo trailer module a current trailer identification number for $^{any}$ cargo trailer within range; and
transmitting the current trailer identification numbers associated with cargo trailers in range to a remote location.

22. The communication system of claim 21, further comprising populating a database at the remote location with current trailer identification numbers associated with cargo trailers in range of the receiver.

23. The communication system of claim 21, further comprising transmitting, to the remote location, at least one of a GPS location and a time stamp associated with reception of a current trailer identification number associated with each cargo trailer in range.

24. The communication system of claim 1, further comprising a tire wear indicator comprising:
a wheel rotation counter; wherein
the communication system is coupled to the wheel rotation counter, wherein the communication system:
receives a count of wheel rotations;
calculates a number of wheel rotations per fixed distance; and
estimates tire wear from the calculated wheel rotations per mile.

25. The communication system of claim 1, further comprising a lookup table that converts the trailer identification number to additional information about the trailer.

26. The communication system of claim 1, wherein the tractor module is programmed to query multiple modules of the trailer in series, including the trailer module, the multiple modules connected to the power line carrier, the series of queries avoiding attempted simultaneous communication via the power line carrier.

* * * * *